US006931591B1

(12) United States Patent
Brown et al.

(10) Patent No.: US 6,931,591 B1
(45) Date of Patent: Aug. 16, 2005

(54) PUBLISHING LAYOUT WIZARD (75) Inventors: Ronald Harold Brown, Olathe, KS (US); Matthew Jason Angell, Kansas City, MO (US)

(73) Assignee: Saepio Technologies, Inc., Kansas City, MO (US)

( * ) Notice: Subject to any disclaimer, the term of this patent is extended or adjusted under 35 U.S.C. 154(b) by 0 days.

(21) Appl. No.: 09/419,360

(22) Filed: Oct. 15, 1999

(51) Int. Cl.$^7$ ............................................. G06F 17/30
(52) U.S. Cl. .................... 715/517; 715/520; 715/500.1; 345/629; 345/619
(58) Field of Search ........................... 707/517; 705/25, 705/26, 27; 715/513, 517, 520

(56) References Cited

U.S. PATENT DOCUMENTS

| | | |
|---|---|---|
| 5,241,464 A | 8/1993 | Greulich et al. |
| 5,535,320 A | 7/1996 | Gay et al. |
| 5,649,216 A | 7/1997 | Sieber |
| 5,845,302 A | 12/1998 | Cyman, Jr. et al. |
| 5,845,303 A * | 12/1998 | Templeman ................. 715/517 |
| 5,890,175 A | 3/1999 | Wong et al. |
| 5,895,475 A * | 4/1999 | Eisenberg .................... 715/517 |
| 5,895,477 A * | 4/1999 | Orr et al. ..................... 715/517 |
| 5,897,622 A | 4/1999 | Blinn et al. |
| 5,900,003 A | 5/1999 | Ben Dror |
| 5,903,905 A | 5/1999 | Andersen et al. |
| 5,930,810 A * | 7/1999 | Farros et al. ................ 715/506 |
| 5,930,811 A * | 7/1999 | Nojima et al. ............... 715/517 |

(Continued)

FOREIGN PATENT DOCUMENTS

| | | |
|---|---|---|
| EP | 0814425 A2 | 12/1997 |
| WO | WO 98/04988 | 2/1998 |
| WO | WO 98/10356 | 3/1998 |
| WO | WO 99/64352 | 12/1999 |

OTHER PUBLICATIONS

Adobe Systems Incorporated, Adobe Photoshop 3.0, 1994, User Guide, pp. 129–133.*

*Primary Examiner*—Stephen Hong
*Assistant Examiner*—Matthew Ludwig
(74) *Attorney, Agent, or Firm*—Bryan Cave LLP (57) ABSTRACT

The present invention facilitates the specification and distribution of templated content materials by a content provider over an information exchange network such as the Internet. The present invention incorporates a system for managing inventories of graphical elements and their relationships to pre-defined page templates. A database capable of keeping track of users and their corresponding access privileges within the system is employed to monitor user activity. Ultimately, through the use of a software component delivered over the Internet for use within standard web browsers, end-users are able to populate templates under the constraints imposed by the rules of the manufacturers at the time of template design. These population elements which "fill in the blanks" of the pre-defined templates may be either of type IMAGE or TEXT. Image regions are populated by choosing from a subset of the entire image inventory, while TEXT types can be completely free form, with specific rules guiding justification, point size, font, and leading, or "fill in the blank" form with the same constraint rules as free form. Once the end user has met all of the criteria for a fully populated template, the system provides sophisticated means for downloading a high resolution file (such as a print-ready file or other file representation of the composed publication) which encapsulates all resources needed (layout, images, fonts, and constraint geometries) to fulfill the requirements of the publication. The downloaded file may be printed or published by electronic transfer, e.g., to a publisher for printing of the actual publication.

16 Claims, 6 Drawing Sheets

U.S. PATENT DOCUMENTS

| | | | |
|---|---|---|---|
| 5,995,724 A | 11/1999 | Mikkelsen et al. | 395/115 |
| 6,002,833 A | 12/1999 | Abecassis | 386/70 |
| 6,125,374 A * | 9/2000 | Terry et al. | 715/502 |
| 6,134,565 A * | 10/2000 | Hommersom et al. | 715/517 |
| 6,233,618 B1 * | 5/2001 | Shannon | 709/229 |
| 6,356,903 B1 * | 3/2002 | Baxter et al. | 707/10 |
| 6,526,423 B2 * | 2/2003 | Zawadzki et al. | 715/506 |
| 6,584,480 B1 * | 6/2003 | Ferrel et al. | 715/513 |
| 6,589,292 B1 * | 7/2003 | Langford-Wilson | 715/517 |
| 6,596,032 B2 * | 7/2003 | Nojima et al. | 715/517 |

\* cited by examiner

PUBLISHING LAYOUT WIZARD

BACKGROUND OF THE INVENTION

1. Field of the Invention

The present invention related to the field of electronic publishing, and more particularly, a tool for the creation of graphically based customizable collateral materials such as advertisements, brochures, signs, door hangers, etc. and anything needing localization from an online master inventory of supplied elements.

2. Description of the Related Art

By way of example, the present invention is described in reference to advertising and the requirements between a manufacturer and its distribution channel. However, any publishing requirements established by any entity such as franchisers, distributors, insurance companies, mutual fund companies and each of the respective agents can take advantage of the present invention.

In the field of print advertising, there are specific channels through which merchants produce advertisements. Typically, a merchant or a dealer who wishes to create a particular print advertisement turns to Co Op Ad books supplied by the manufacturers. In these Co Op Ad books, manufacturers provide pre-approved company logos, trademarks, graphics, and other relevant promotional materials to be used in advertising campaigns, local ads, and other print media. The manufacturers may participate in the advertising costs and collateral printing costs. As a result, manufacturers experience significant costs in maintaining the materials supplied to the merchants or dealers and exert very little control in how the materials are utilized. Overall, this type of marketing program is expensive to maintain and update, difficult to use by the merchants or dealers, and difficult for the manufacturers to monitor compliance by the merchants or dealers. Furthermore, once the proper layout of the advertisement has been completed, there exists the difficult task of getting the hard copy to the printers for publishing.

Accordingly, it would be highly desirable to develop an online channel to facilitate content providers in making available all advertising graphics, materials and layouts that meet their specification and/or rule-set. With such a system, merchants or dealers on one side would have much easier access to advertising materials provided by the manufacturers on the other side. In addition, the completed layout of the advertisements could easily be transferred electronically to the publishers for printing. This would allow more efficient application of advertising materials than ever before.

SUMMARY OF THE INVENTION

The present invention facilitates the specification and distribution of templated content materials by a content provider over an information exchange network such as the Internet. The present invention incorporates a system for managing inventories of graphical elements and their relationships to pre-defined page templates. At database capable of keeping track of users and their corresponding access privileges within the system is employed to monitor user activity. Ultimately, through the use of a software component delivered over the Internet for use within standard web browsers, end-users are able to populate templates under the constraints imposed by the rules of the manufacturers at the time of template design. The population elements which "fill in the blanks" of the pre-defined templates may be either of type IMAGE or TEXT. Image regions are populated by choosing from a subset of the entire image inventory, while TEXT types can be completely free form, with specific rules guiding justification, point size, font, and leading, or "fill in the blank" form with the same constraint rules as fee form. Once the end user has met all of the criteria for a fully po0ulated template, the system provides sophisticated means for downloading a high resolution file (such s a print-ready file or other file representation of the composed publication) which encapsulates all resources needed (layout, images, fonts, and constraint geometries) to fulfill the requirements of the publication. The downloaded file may be printed or published by electronic transfer, e.g., to a publisher for printing of the actual publication.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims.

The present invention is directed to publishing of content, such as graphics and textual material. To facilitate an understanding of the principles and features of the present invention, they are explained herein below with reference to its deployments and implementations in illustrative embodiments. By way of example and not limitation, the present invention is described herein-below in reference to examples of deployments and implementations for advertisements and, more particularly, composing and publishing advertisements via an information exchange environment and, more particularly, in the Internet environment.

The present invention can find utility in a variety of implementations without departing from the scope and spirit of the invention, as will be apparent from an understanding of the principles that underlie the invention. It is understood that the publishing concept of the present invention may be applied to publishing of materials of other nature, in any format or on any media, whether in an information network environment or otherwise. For example, the publishing concept of the present invention may be applied to publications such as advertisements, web pages, brochures, signs, posters, booklets, books, pamphlets, door hangers, billboards, overlays, iron-ons, stickers, cards, newsprint, binding, etc., in the form of prints, digital files, audio, audio files, video, video file, etc., which one party may wish to facilitate and control the scope and manner of the use of its contents for such publications. The content material composed for publication includes graphics that may include textual components, whether represented graphically or in character fonts. Hence, reference to graphics herein may include texts as well.

Information Exchange Network

The invention may be implemented on any platform involving, without limitation, distributed information exchange networks, such as public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such networks and communications facility involve both software and hardware aspects.

A method or process is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose digital processing and/or computing devices, which devices may be standalone devices or part of a larger system. The devices may be selectively activated or reconfigured by a program, routine and/or a sequence of instructions and/or logic stored in the devices. In short, use of the methods described and suggested herein is not limited to a particular processing configuration. Prior to discussing details of the inventive aspects of the present invention, it is helpful to discuss one example of a network environment in which the present invention may be implemented.

Figure 1:
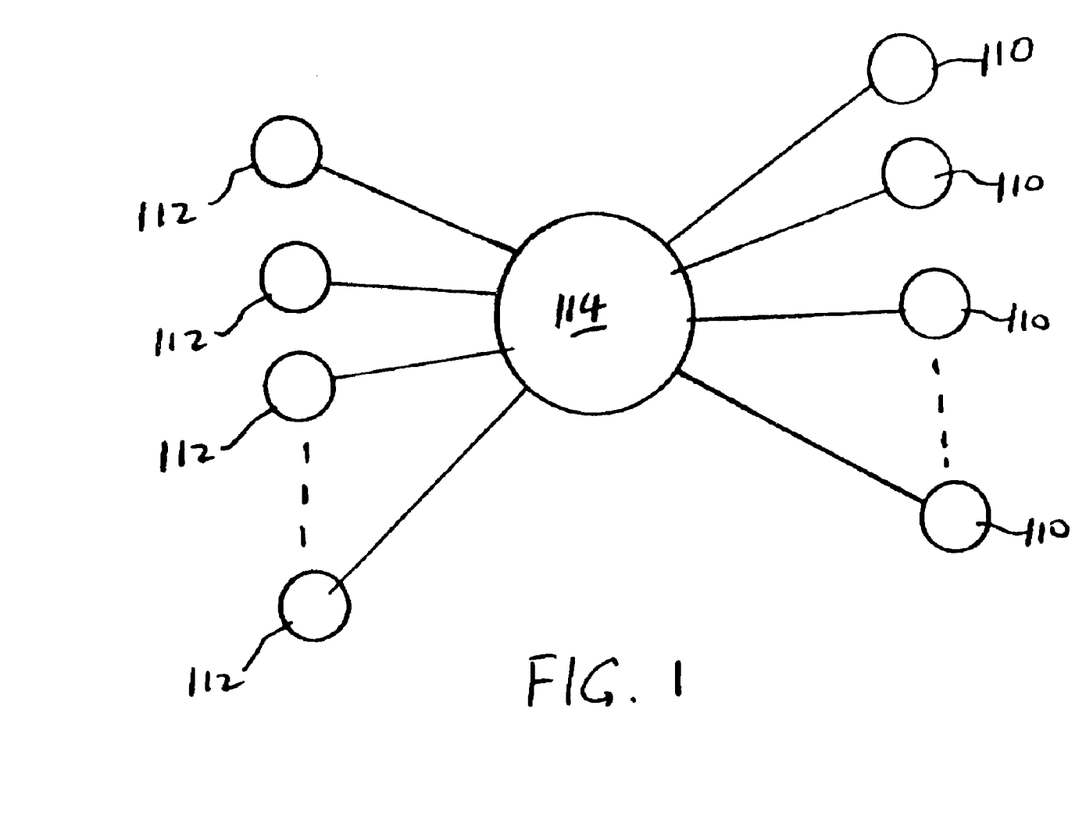
FIG. 1 is a schematic representation of one embodiment of a computer network through which the publishing process of the present invention may be implemented.

The Internet is an example of an information exchange network including a computer network in which the present invention may be implemented, as illustrated schematically in FIG. 1. Many servers 110 are connected to many clients 112 via Internet network 114, which comprises a large number of connected information networks that act as a coordinated whole. Details of various hardware and software components comprising the Internet network 114 are not shown (such as servers, routers, gateways, etc.) as they are well known in the art. Further, it is understood that access to the Internet by the servers 110 and clients 112 may be via suitable transmission medium, such as coaxial cable, telephone wire, wireless RF links, or the like. Communication between the servers 110 and the clients 112 takes place by means of an established protocol. As will be noted below, the publishing system of the present invention may be configured in or as one of the servers 110, which may be accessed by users and content providers via clients 112.

Figure 2:
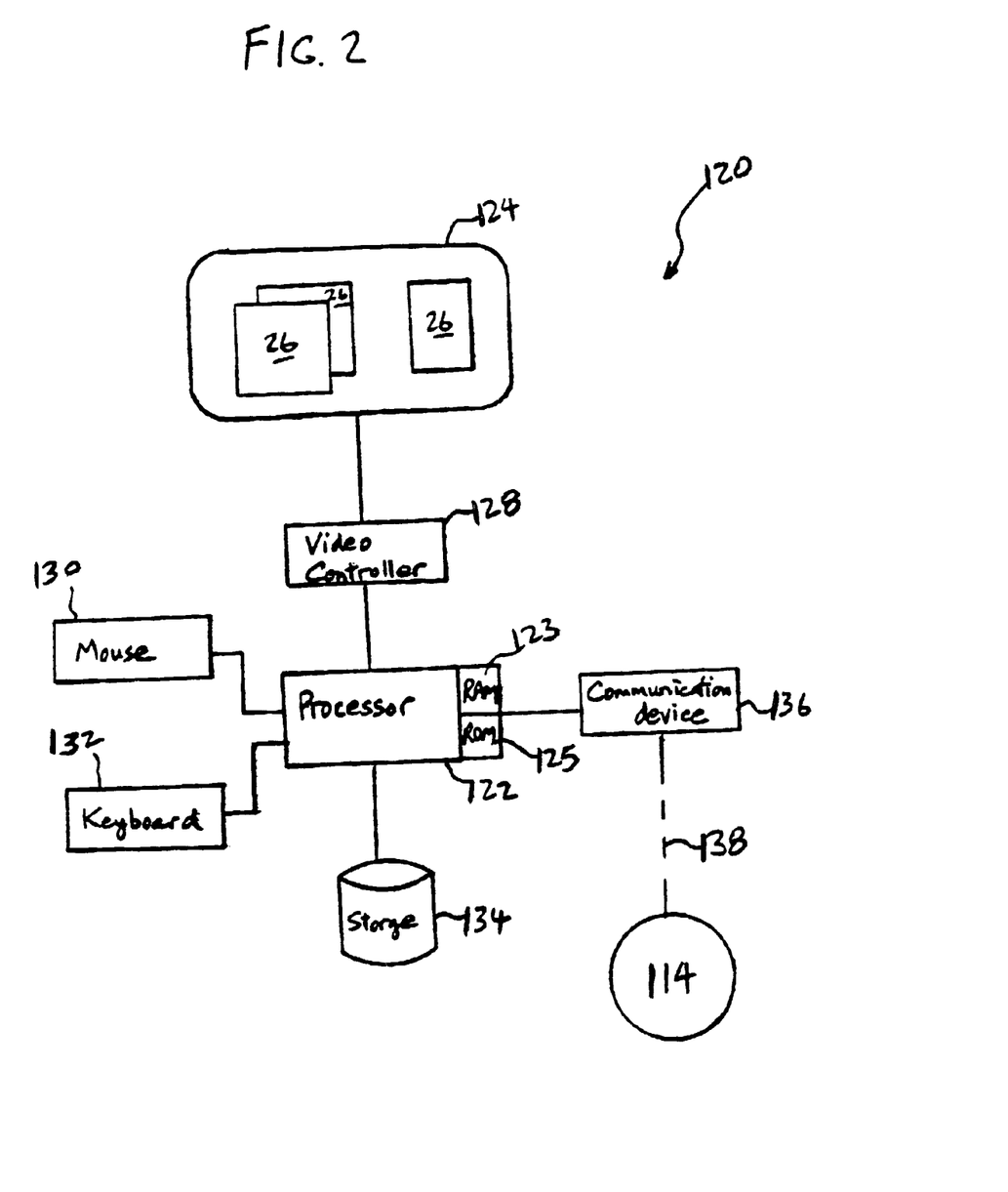
FIG. 2 is a schematic representation of one embodiment of a computer system that facilitates the publishing process of the present invention.

Turning now to FIG. 2, there is schematically illustrated one embodiment of a computer system 120 which may be configured as the client 112 for navigating the Internet. The computer system 120 communicates with the Internet network 114. The computer system 120 includes a processor 122, internal random-access memory ("RAM") 123 and read-only memory ("ROM") 125, and a data bus architecture for coupling the processor 122 to various internal and external components. The computer system 120 further includes a communication device 36 which, in turn, is coupled to a communication channel 38 for effecting communication with the Internet network 114. A mass storage device 34, such as a hard disk drive or floppy disk drive of CD-ROM drive, is coupled to the processor 122 for storing utility and application software (including a suitable web browser for navigating the Internet) and other data. The application software is executed or performed by the processor 122.

User actuatable input devices are also coupled to the processor 122, including a cursor positioning device 130 and a keyboard 132 in accordance with the present invention. The cursor positioning device 310 is representative of any number of input devices that produce signals corresponding to a cursor location on the display 124, and may include by way of example, a mouse, a trackball, an electronic pen, or a touch-pad, which may be an integral part of the keyboard 132. A display 124 is coupled to the processor 122 through a video controller 128. The video controller 128 coordinates the presentation of information on the display 124 in one or more windows 126. Generally, the windows 126 are scalable, thus permitting a user to define the size and location of a particular window 126 on the display 1124.

The server 110 could also have similar components as the computer system 120 depicted in FIG. 2. The program configuration of the client 112 and server 110 would be apparent given the disclosure of the desired functions of the client 112 and server 110 disclosed hereinbelow. Basic online processes are well known in the art.

System Overview

Figure 3:
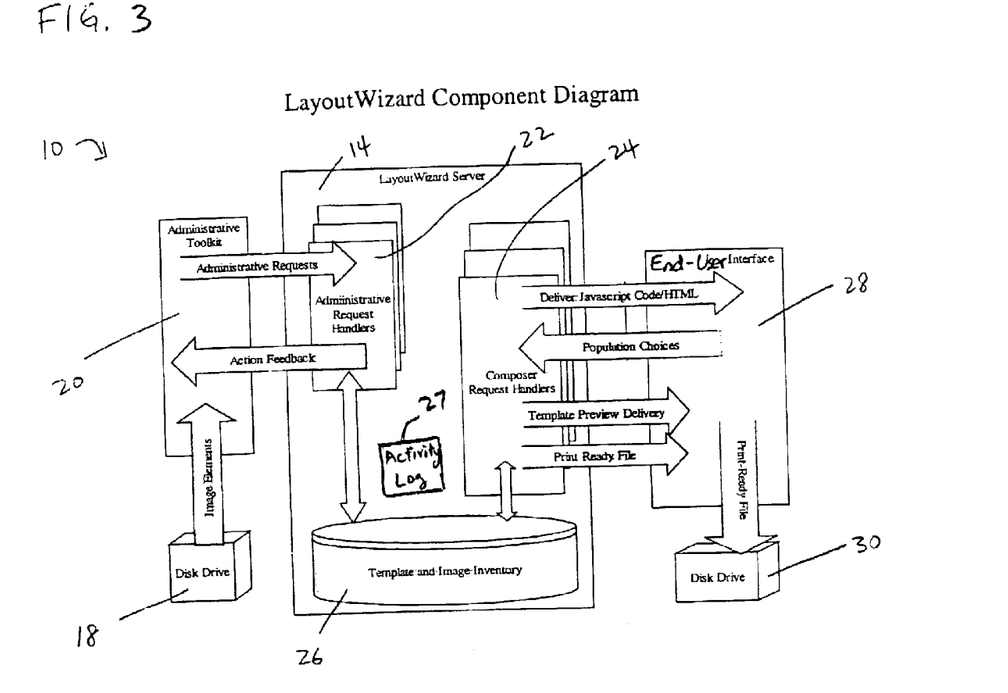
FIG. 3 is a schematic block diagram of the publication layout system.

The present invention will be described in reference to FIG. 3. The publication layout system 10 generally consists of three-party inter-operative components, namely, the Administrative Toolkit 20, the System Server 14, and the End-User Interface 28. The Administrative Toolkit 20 is the interface through which the content providers will provide company logos, trademarks, graphics, and other relevant advertising/promotional materials. The System Server 14 is the central unit that bridges the Administrative Toolkit 20 with the End-User Interface 28. The System Server 14 will actually store the various manufacturers' advertising materials as well as keep track of all of the merchants and dealers (the end-users) who have access to the End-User Interface 28. As such the System Server 14 will act as the brain of the overall publication layout system 10.

Figure 4:
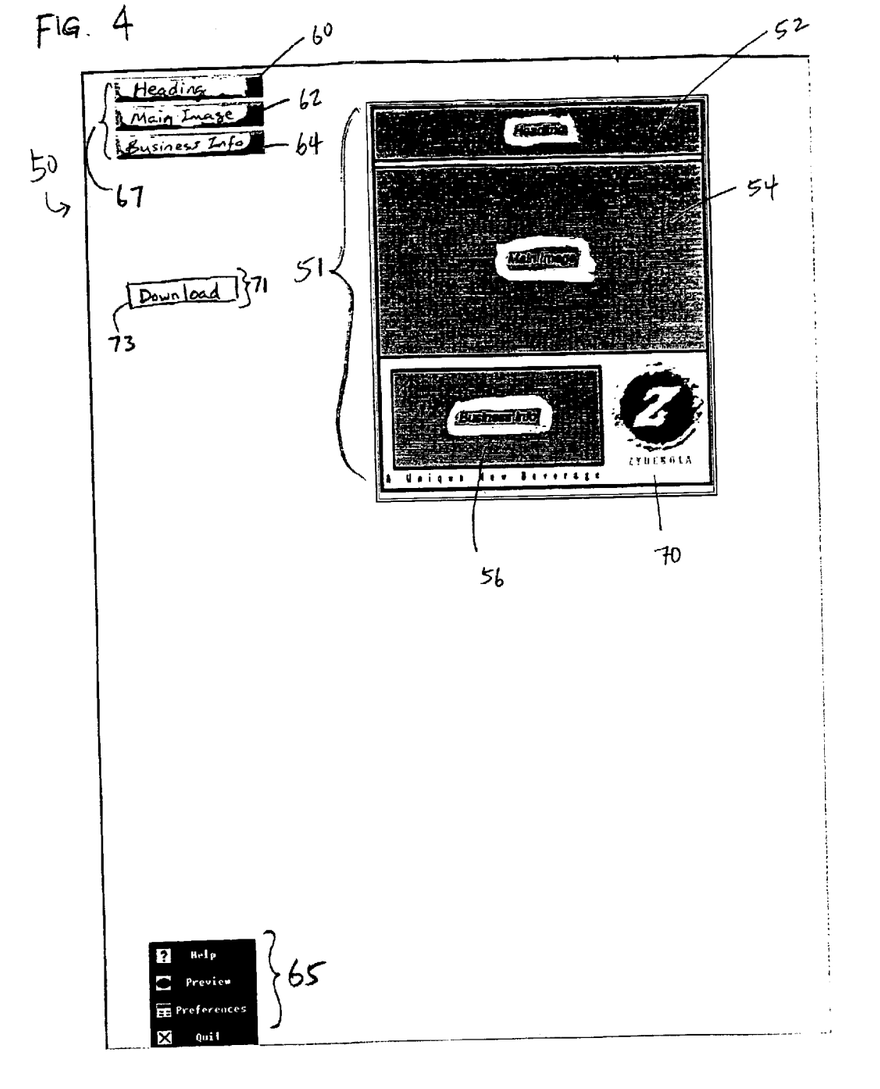
FIG. 4 is a diagram of the advertisement layout window.

Not to be taken in a limiting sense, a simple example of the various parties involved in using the publication layout system 10 could consist of an automobile manufacturer as the content provider, the system manager, and the individual automobile dealerships as the user. The automobile manufacturer may have logos, trademarks, as well as pictures of cars in their company lineup and other advertising material prepared for distribution to the individual dealerships. Instead of collating such prepared material in print form for distribution, the automobile manufacturers would log onto the system 10 via the Administrative Toolkit 20 and upload all the necessary advertising materials to be accessed by the individual dealerships for various campaigns. The System Server 14 would serve as a central location in which the end-users (individual automobile dealerships) could access materials in preparation for their weekly newspaper advertisements. The manufacturers are able to create/develop template designs for the dealers and merchants to use. These templates would be the outline of the pre-approved advertisements. Having been supplied by the manufacturers themselves, these templates, would meet the specific standards and guidelines set by the manufacturers. Accessing these templates electronically, the dealerships would then be able to choose among the various content possibilities to go with these templates. These content possibilities are referred to as population choices. In FIG. 4, the window 50 is an example of what would appear to the dealership for the creation of the advertisement on a pre-defined template 70. The templates have particular regions for different parts of the advertisement. For example, the headline region 52, the main image region 54, and business information region 56 may come together to create an advertisement depicted in FIG. 4. Each dealership would then "populate" a given region with the given content choices by selecting the "Headline" button 60, the "Main Image" button 62 and the "Business Info" button 64. These content choices would range from picking the correct font and point size of text to cropping particular pictures and images to go with a particular advertisement. Therefore, accessing the System Server 14 via the End-User Interface 28, each individual dealership would be able to tailor their advertisements following the guidelines and protocols set by the manufacturers. A relatively low-resolution image of the layout of the entire advertisement is created at the End-User Interface 28. After such an advertisement is created following the guidelines set by the manufacturers and enforced by the System Server 14, the advertisement is ready for publication by downloading a high-resolution file from the System Server 14. In this manner, large high-resolution files representing the content need not be downloaded during the development stage of the advertisement, which would otherwise result in data traffic. The final high-resolution file is downloaded only when the advertisement has been finalized and accepted by the user.

Administrative Toolkit

The Administrative Toolkit 20 may be implemented in a client machine such as client 12 in FIG. 1 and FIG. 2. The Administrative Toolkit 20 handles all of the administrative functions within the publication layout system 10. Through the use of the Administrative Toolkit 20, content providers interface with the publication layout system 10 and set all of the required restrictions and guidelines of creating a print advertisement. The Administrative Toolkit 20 has access to media containing the layouts, advertising images, graphics, and text material, through its interface with the System Server 14.

Figure 5:
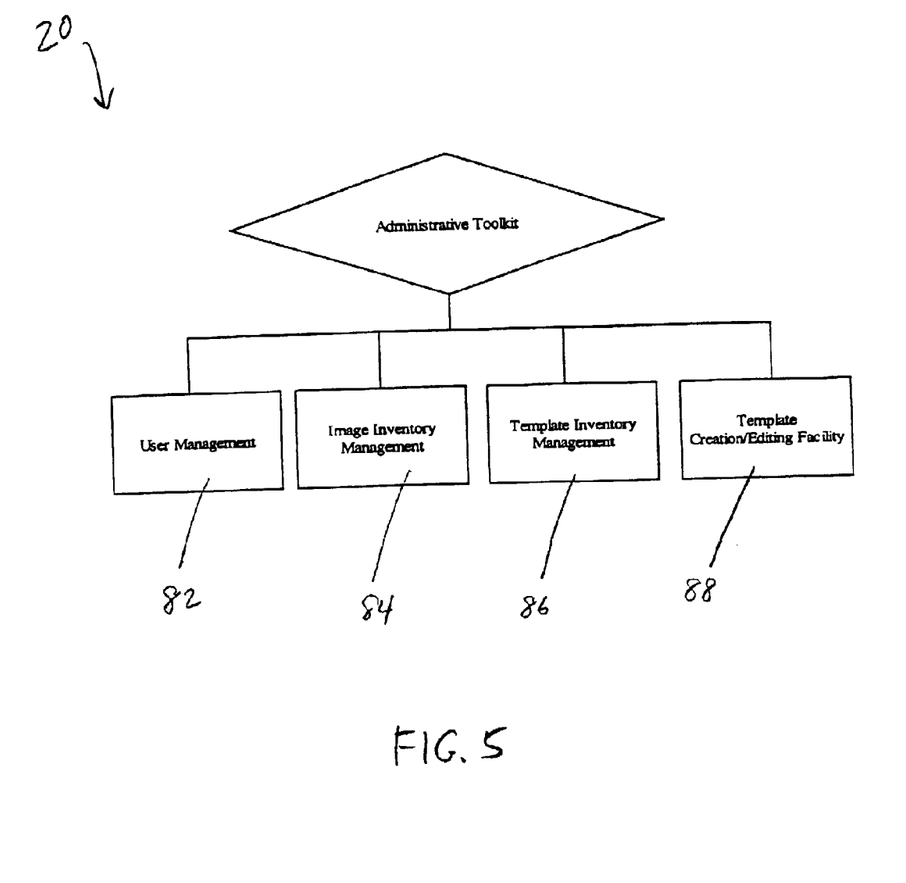
FIG. 5 is a schematic block diagram of the Administrative Toolkit.

As shown in FIG. 5, the Administrative Toolkit comprises four modules: (1) the User Management Module 82; (2) the Image Inventory Management Module 84; (3) the Template Inventory Management Module 86; and (4) the Template Definition and Editing Tool Module 88.

In the User Management Module, each user (manufacturer) within the database is assigned an access level. There are five access levels of which four levels are dedicated to the manufacturers supplying the advertising materials and guidelines and one is dedicated to the end-user (merchants and dealers). Each level is granted varying scopes of access and functions within the publication layout system 10. The top-most level is the Administrator level which allows one to perform any action within the Administrative toolkit 20. Such a person can view any template via the End-User Interface 28, and avoid any restrictions attached to the template regarding downloading restrictions. Essentially, the Administrator level sets the rules of the overall publication layout system 10 for a particular manufacturer. The next level down is the Developer level which grants one all of the access of an Administrator except user administration. (The user administration function enables one to add/delete an authorized user from the publication layout system. In addition, the user administration function enables one to specify a particular user's level of access within the publication layout system). The next level down is the Manager level which allows one to access all of the Developer functions except template creation/editing/layout. The last level on the manufacturer side is the Approver level which allows one to approve and reject completed templates submitted by end-users. It is up to such an Approver to monitor and control the advertising templates submitted by end-users. The Approver has no further access to the overall publication layout system 10. On the other side, the merchants and dealers are granted the End-User status which allows one to access System Server 14 via the End-User Interface 28, but with download restrictions of completed advertising schemes within the layout approval subsystem.

The Image Inventory Management Module 84 allows manufacturers to create directories and sub-directories within the Image Inventory 26 of the System Server 14. The Image Inventory 26 is accessed via interaction between the Administrative Toolkit 20 and the System Server 14. Images can be uploaded into the Image Inventory 26. Upload also supports the dynamic decompression of previously compressed archives (preserving directory structure) into the Image Inventory 26. Integrity checks, such as steps to correct file formats, verify file extension match or mismatch, and identify file corrupt or non-corrupt, are performed on all images placed into the Image Inventory 26, with immediate feedback to the user upon failure of those tests. Currently, the Image Inventory 26 supports EPS, PSD, GIF, JPG, and TIFF files, and other industry standard file formats from file conversion utilities, for the various images. Images can also be deleted within this module.

In the Template Inventory Management Module 86, users with authorization of managers and above can move to and from Production and Development areas of the publication layout system. This feature is extremely useful and convenient when certain changes or updates need to be implemented in the Image Inventory 26. For example, if a person with access status of manager or above wishes to implement changes in the Image Inventory 26 for a new line of products, she can first enter the Development site to make necessary changes and experiment with new designs without ever affecting the Production site. Once the changes have been satisfactorily implemented, she can replace the Production site with the Development site for instant update. Such instantaneous change allows for smooth transitions. Using the Template Inventory Management module 86, one can delete templates. One can also check image references within any selected template for display to the developer.

Using the Template Definition and Editing module 88, all layout templates, image resource population choices, and text rules and placements are defined. Creation and editing of templates are performed within a graphical layout environment similar in design to other popular layout software tools such as Quark Express and PageMaker. Rectangular regions are drawn on to a virtual page and rules applied which are enforced by the End-User Interface 28. The purpose of this module is to define the exact placement, constraint ratios, text rules, page size, download restrictions, and region ordering (for purposes of interface presentation to an end-user). Common functionality supplied to the developer of each template (region grouping, copy paste functions, page setup/size, undo/redo functions, dynamic zoom and view percentages, etc.). At any point, a template can be saved to the server preserving all rules and placement for presentation for the end-user. Each template is comprised of any combination and placement of three main region types: (1) Image region, (2) Text region, and (3) Frame region. Each of these three region types, except for the Frame Region, are labeled with a proper title (e.g., headline, main image, business contact information, etc.), so that the region can be easily recognized by the end-users within the composition interface.

Within the Image Region, the end-user will be able to choose and populate the specific region at composition time from an image resource list. For example, a particular car dealership will be able to choose from an array of pictures taken for specific automobile to place on that specific region of the advertisement. Thus, if an automobile manufacturer provides five different shots of the same car but from different angles, the car dealership can choose the picture which he prefers to use in the local newspaper advertisement. The template developer can also fix a particular image into a region, such that the end user will have no choice about which image will be placed in the region. The developer also has the ability to allow a user to upload an image from his local hard drive to be placed into the region. The X/Y position within this Image Region will define the location within the page at which the image will be placed. In addition, the Horizontal and Vertical Sizes will define the maximum amount of space an image will be allowed to occupy once specified. Just how large the image will actually appear within the region depends upon its Justification Rules selected for that region. The Justification Rules determine the size and aspect ratio that the placed image will appear. Justification Rules are divided into horizontal and vertical justification rules as described below:

| HORIZONTAL | VERTICAL |
| --- | --- |
| CENTER: if the width of the placed image is less than the maximum allowed by the region's horizontal size, the image will be centered horizontally within the image region. | CENTER: If the height of the image is less than the maximum allowed by the region's vertical size, the image will be centered vertically within the image region. |
| LEFT: the image will be placed flush with the left most border of the region. | TOP: the image will be placed flush with the topmost border of the region. |
| RIGHT: the image will be placed flush with the rightmost border of the region. | BOTTOM: the image will be placed flush with the bottom most border of the region. |
| FULL: the system will attempt to scale the image so that both vertical edges are flush with the rightmost and leftmost vertical borders of the region. | FULL: The system will attempt to scale the image so that both horizontal edges are flush with the topmost and bottommost horizontal borders of the region. |

In all combinations except Horizontal: FULL and Vertical: FULL, the placed image will maintain its original aspect ratio. However, in the case where full justification is applied on both axes, the image will fit exactly to the size of the region, ignoring the aspect ratio of the original image.

Within the Text Regions, there are individual text lines, each of which can adhere to different set of properties. Each unique property for each unique text line can be optionally left "open" allowing the end-user to assign the property. The properties of the Text Regions are as follows:

| | |
| --- | --- |
| FONT | Any font currently existing within the server environment can be chosen such that the text specified at population time will appear with that particular typeface. |
| POINT SIZE | Determines the point size that the particular text line will be drawn in |
| LEADING | The amount of vertical space between lines of text. |
| JUSTIFICATION | CENTER, LEFT, RIGHT, or FULL |
| COLOR | Specified currently in a RGB value. |
| FIXED TEXT | This property allows the template developer to fix text into the line, effectively disallowing the end-user to specify any text of his own at composition time. The developer can format the fixed text in a fashion the placed "tags" within the text, allowing the end-user to "fill in the blanks," while disallowing modification of any text which is not blank. |

A Frame Region is simply a square region which has a square frame, and an optionally filled background. The point size of the line frame can be of any width, and the background can also be optionally left transparent, such that the region behind the frame will show through. No options are available for the end-user to specify with regard to frame regions.

System Server

The System Server 14 may be implemented in a server machine such as the server 10 in FIG. 1 and FIG. 2. The System Server 14 orchestrates communication between the other process components of the overall publication layout system 10. The System Server 14 operates behind, for example, a standard HTTP/1.1 server residing on a UNIX variant Operating System. The System Server 14 comprises four sub-systems: (1) the Administrative Request Handlers 22; (2) the End-User Request Handlers 24; (3) Template and Image Inventory 26; and (4) Activity Log Database 27. The Administrative Request Handlers 22 oversee all requests originating from the Administrative Toolkit 20. In addition, users of the publication layout system 10 are verified and access to the system is limited according to the various levels. The End-User Request Handlers 24 give the merchants and dealers the various image population choices, including the support for user uploadable image resources, and subsequently loads the template information according to the population choices. The Template and Image Inventory 26 is the storage management module. The Activity Log 27 maintains a running log of all actions from both administrative user (manufacturers) and end-users (merchants and dealers).

End-User Interface

The End-User Interface 28 may be implemented in a client machine such as the client 12 in FIG. 1 and FIG. 2. The End-User Interface 28 has access to a storage media 30 that is capable of saving the print-ready files. The End-User Interface 28 provides composition functionality to end-users. The end-users log on to the System Server via an information exchange network, such as the Internet using a unique user-id and a password. After logging-on to the system, the end-user has access to creating advertisements with the restrictions imposed by the administrator. Once a template is chosen by clicking a specially formatted link (within a HTML page), the composition interface is initiated by the web browser. The web browser receives all of its client side code by requesting it from the server. Once all client code is loaded, the server is instructed to load the template chosen, and then is displayed within the browser. The interface is comprised of four main areas, each of which provides certain piece of functionality to the end-user. These four main areas include: (1) Region Menu 67, (2) Template Preview Area 51, (3) Action Command Area 65, and (4) Download Command Area 71.

The Region Menu 67 comprises a set of buttons 60, 62 and 64 that present all of the regions 52, 54 and 56 for which the end user must provide choices for region population. Each region within the template, which requires population by the end-user, will appear in the Region Menu 67 according to the region order list specified during template specification. Each region option is listed by its region title (e.g., Heading, Main Image, and Business Info) on the button. Upon selection of a region by clicking on the corresponding button, a second window will be presented to the user with the image options available to him according to the template specification. The user can select by clicking on the desired image option. As the user progresses through all of the regions, a graphical display will indicate which of the regions have been populated, and which ones remain unspecified. If, for example, when the main image region 54 is selected by clicking the corresponding button 62, a window will pop up on the front of the window and present all of the possible image choices in thumbnail fashion. When an image is located and selected, it will populate the region 54 within the template 70 constrained by all of its properties assigned at time of specification. In the event that the template developer requested that the end-user be allowed to upload his own image into the region, an interface will be provided to the end-user enabling him to navigate their local hard-drive and select an image to upload. If, for example, the Business Info (text) region 56 is selected, the window will present an HTML form allowing the end-user to specify all text and optional properties for that region.

After each region 52, 54 and 56 is populated with end-user supplied choices, the Template Preview Area 51 may be configured to be automatically updated to reflect the newly supplied information. The preview area can optionally be flagged as "non-volatile," in which case it will not update unless a "preview" button is pressed within the Action Command Area 65. The preview serves as a "work in progress," and regions which have been populated will reflect those population choices. Regions 52, 54 and 56 which have yet to be supplied with data by the end-user will appear as gray boxes in the exact position and size of the region as drawn out in the administrative template creation tool. As such, the gray boxes will act as placeholders until the end-user makes the population choices. Once the user has completely specified all choices for all regions, the preview serves as a true representation (albeit at low-resolution) of the final image file which can then be downloaded or submitted for approval.

The Action Command Area 65 consists of four buttons labeled: (1) Preview, (2) Preferences, (3) Help, and (4) Quit. The end-user's clicking of the Preview button immediately updates the Template Preview Area to reflect all currently supplied population choices. The Preferences choice currently presents the end-user with Preview Zoom Level and Non-Volatile preview update choices. The Help button takes the user to a dynamically-linked help page. The Quit function enables the end-user to exit the composition interface and to immediately close all windows comprising the interface.

The Download Command Area 71 will be available to the end-user in the case that the template developer has specified that any fully populated template can be immediately downloaded by the end-user. In such a case, a "download" button 73 will appear after the first population choice has been made and previewed. Pressing the button 73 will present the end-user with a choice regarding the format of the final high-resolution print ready file.

The choices currently being offered are PDF, EPS, and TIFF. Once the choice is made and submitted, the server will be requested to encapsulate all resources such as the fonts, images, and layout into the final image file. The end-user will then be presented with the ability to navigate his hard-drive, locate a directory to place the file, and then download the print-ready file to his hard drive. All print-ready files are automatically compressed to expedite the download process over slow connections. In the case that the template developer placed an "approval" restriction on the template, the final compositions must be submitted for approval. Thus, instead of a "download" button, a "submit layout" button is placed within the Download Action Area. Once pressed, the approver will be notified that a particular advertisement populated with end-user's choices is awaiting approval. The end-user will be given feedback indicating that the image has been submitted for approval, and will have to wait for the approver to agree that the image meets pre-defined specifications. At this point, the approver can view the image, make edits to the composition using the same end-user interface, or reject the advertisement. In the case of approval, the end-user will be sent a piece of e-mail indicating the new acquired "approved" status and a special URL to go and download his image (at this point all of the same download options will be available to the end-user). In the case of rejection, the end-user will also be notified via e-mail, and a special URL will be supplied allowing him to return to his composition in progress, make necessary edits/ changes, and re-submit the changes into the approval process once again. After the approval, the advertisement is ready for printing. In addition, the downloaded version can be used for other outputs as well, such as internet banner advertisements.

Figure 6:
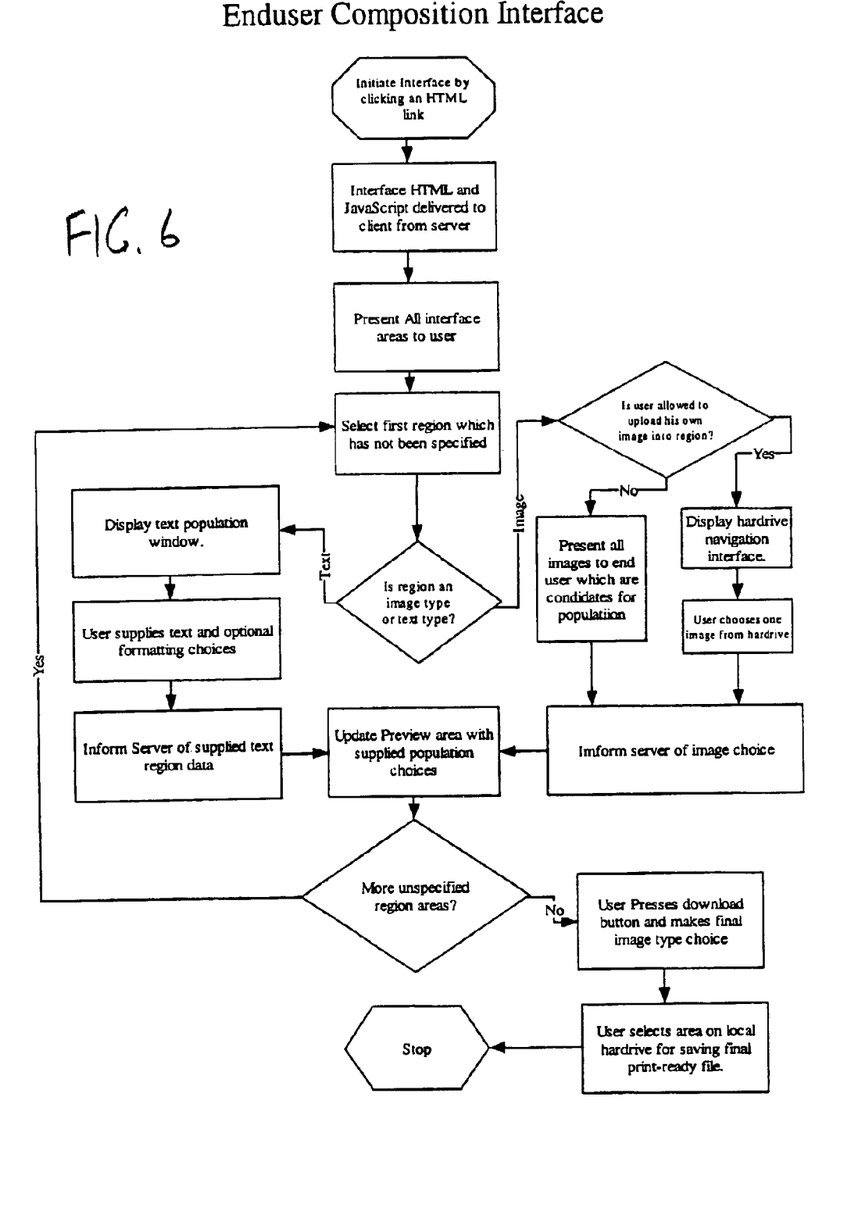
FIG. 6 is a flow chart representation of the processes via the end user composition interface.

FIG. 6 depicts the flow process handled by the end user interface for composing the publication material (e.g., advertisements in our example above). The flowchart provides additional details to the general functional description of the interface above.

The process and system of the present invention has been described above in terms of functional modules in block diagram format. It is understood that unless otherwise stated to the contrary herein, one or more functions may be integrated in a single physical device or a software module in a software product, or a function may be implemented in separate physical devices or software modules, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation, to include all the features and functions of the present invention described above.

While the invention has been described with respect to the described embodiments in accordance therewith, it will be apparent to those skilled in the art that various modifications and improvements may be made without departing from the scope and spirit of the invention. For example, the publishing process can be easily modified to accommodate the situation in which users compose and publish content provided online by a content provider, in any format or in any media. Instead of the graphical End-User Interface 28, other forms of user interface may be adopted without departing from the scope and spirit of the invention. For example, a menu driven interface may be designed to give a user a selection of content components for the user to compose a publication. The user selects from the content listing the components she desires to create a publication having parameters consistent with the layout and rule set defined by the content provider. Alternatively, a form based user interface may be designed to present a list of questions to be answered by the user. The answers would be based to retrieve the appropriate content components from the System Server to compose a publication having parameters consistent with the layout and rule set specified by the content provider.

We claim:

1. A computer-implemented system for laying out a publication, the system comprising:
   a. an administrative toolkit for allowing a template creator at a first location to create a template and input content components for populating the template, the administrative toolkit comprising:
      i. a template definition and editing module for:
         1. creating the template at a development site accessible to the template creator, the template comprising a plurality of template regions; and
         2. establishing rules governing content to be placed in one or more of the regions of the template; and
      ii. a template inventory management module for moving the template from the development site to a production site accessible to an end user, thereby instantaneously updating the production site;
   b. an end-user interface for allowing the end-user at a second location remotely located from the first location to:
      i. access the template over an information exchange network after it has been moved to the production site; and
      ii. populate one or more of the regions with content in accordance with the rules established by the template creator, whereby the end-user can create a customized publication that conforms to standards set by the template creator.

2. The system of claim 1, wherein the content components comprise images.

3. The system of claim 1, wherein the content components comprise text.

4. The system of claim 1, wherein the administrative toolkit is further adapted for designating the size and position of each of the regions.

5. The system of claim 1, further comprising a server in communication with the administrative toolkit and end-user interface, the server facilitating communications between the administrative toolkit and end-user interface.

6. The system of claim 5, wherein the server comprises:
   a. an administrative request handler for servicing the administrative toolkit; and
   b. an end-user request handler for servicing the end-user interface.

7. The system of claim 5, wherein the server comprises a template and image inventory for storing templates and content components.

8. The system of claim 1, wherein the publication is a print publication.

9. The system of claim 1, wherein the publication is an advertisement.

10. The system of claim 1, wherein the administrative toolkit is further adapted for designating region type, and wherein the regions can be designated as text regions or image regions.

11. The system of claim 10, wherein the rules further comprise a rule prescribing one or more text properties for one or more text regions.

12. The system of claim 10, wherein the rules further comprise a rule prescribing that one or more of the text regions are populated with free-form text.

13. The system of claim 1, wherein the administrative toolkit further comprises a user management module for establishing a plurality of levels of access for system users and controlling user access based upon rights given to each of the plurality of levels.

14. The system of claim 1, wherein the administrative toolkit further comprises an image inventory management module for managing an inventory of images.

15. The system of claim 1, wherein the rules governing content to be placed in one or more of the regions comprises a rule prescribing that one or more of the regions be populated by selecting a content component from a plurality of designated content components.

16. A computer-implemented system for laying out a publication, the system comprising:
   a. an administrative toolkit for allowing a template creator at a first location to create a template and input content components for the template, the administrative toolkit comprising:
      i. an image inventory management module for allowing the template creator to input images for populating templates;
      ii. a template definition and editing module for allowing the template creator to:
         1. create and edit a template at a development site, the template comprising a plurality of template regions;
         2. designate the size and position of each of the regions;
         3. designate the type of each region, wherein the region types comprise text and image types;
         4. import ages input using the inventory management module and designate the images for populating one or more of the template regions;
         5. input text and designating the text for populating one or more of the template regions;
         6. establish rules governing content to be placed in one or more of the regions, wherein the rules comprise:
            a. a rule prescribing that one or more of the regions be populated by selecting an image or text component from a plurality of designated images or text components; and
            b. a rule prescribing one or more of the regions to be populated with free-form text;
      iii. a template inventory management module for moving the template form the development site to a production site accessible to an end user, thereby instantaneously updating the production site;
   b. an end-user interface for allowing the end user at a second location remotely located from the first location to:

i. access the template over an information exchange network after it has been moved to the production site; and
ii. populate one or more of the regions with content in accordance with the rules established by the template creator, wherein the end-user interface allows the end user to:
   1. populate one or more of the regions by selecting an image or text component from the plurality of designated images or text components; and
   2. populate one or more of the regions by inputting free-form text; whereby the end-user can create a customized publication that conforms to standards set by the template creator; and c. a server in communication with the administrative toolkit and end-user interface for facilitating communications between the template creator and end user, the server comprising:
   i. an administrative request handler for servicing the administrative toolkit;
   ii. an end-user request handler for servicing the end-user interface; and
   iii. a template and image inventory for storing templates created by the template creator and images input by the template creator.

\* \* \* \* \*

UNITED STATES PATENT AND TRADEMARK OFFICE
CERTIFICATE OF CORRECTION

PATENT NO. : 6,931,591 B1
DATED : August 16, 2005
INVENTOR(S) : Brown et al.

It is certified that error appears in the above-identified patent and that said Letters Patent is hereby corrected as shown below:

Column 12,
Line 47, replace "ages" with -- images. --.
Line 62, replace "form" with -- from. --.

Signed and Sealed this

Seventh Day of February, 2006

JON W. DUDAS
*Director of the United States Patent and Trademark Office*